United States Patent
Yoon et al.

(10) Patent No.: US 11,108,513 B2
(45) Date of Patent: Aug. 31, 2021

(54) METHOD FOR TERMINAL AND BASE STATION INCLUDING MULTIPLE TRANSMISSION AND RECEPTION POINTS (TRP) TO TRANSMIT/RECEIVE SIGNALS IN WIRELESS COMMUNICATION SYSTEM, AND DEVICE THEREFOR

(71) Applicant: LG ELECTRONICS INC., Seoul (KR)

(72) Inventors: Sukhyon Yoon, Seoul (KR); Kijun Kim, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 16/484,804

(22) PCT Filed: Feb. 12, 2018

(86) PCT No.: PCT/KR2018/001832
§ 371 (c)(1),
(2) Date: Aug. 8, 2019

(87) PCT Pub. No.: WO2018/147700
PCT Pub. Date: Aug. 16, 2018

(65) Prior Publication Data
US 2020/0007282 A1 Jan. 2, 2020

Related U.S. Application Data

(60) Provisional application No. 62/457,164, filed on Feb. 10, 2017.

(51) Int. Cl.
*H04L 5/00* (2006.01)
*H04W 36/00* (2009.01)
(Continued)

(52) U.S. Cl.
CPC .......... *H04L 5/0035* (2013.01); *H04L 5/0055* (2013.01); *H04W 36/0058* (2018.08);
(Continued)

(58) Field of Classification Search
CPC .............. H04L 5/0035; H04L 5/0055; H04W 36/0069; H04W 36/0058; H04W 52/216; H04W 72/0413; H04W 72/085
See application file for complete search history.

(56) References Cited

U.S. PATENT DOCUMENTS 10,721,763 B2 * 7/2020 Rico Alvarino .. H04W 72/0446
2017/0332371 A1 * 11/2017 Kubota ................ H04B 7/0621
(Continued)

OTHER PUBLICATIONS

PCT International Application No. PCT/KR2018/001832, Written Opinion of the International Searching Authority dated May 17, 2018, 26 pages.
Huawei, et al., "Discussion on the RRM requirements for NR", 3GPP TSG RAN WG4 Meeting #80bis, R4-167790, Oct. 2016, 6 pages.
Huawei, et al., "Uplink based mobility in high frequency—connected active state", 3GPP TSG RAN WG2 Meeting #96, R2-168562, Nov. 2016, 8 pages.
Convida Wireless, "Discussion on Paging for NR", 3GPP TSG RAN WG1 Meeting #88, R1-1702583, Feb. 2017, 4 pages.

*Primary Examiner* — Kent Krueger
(74) *Attorney, Agent, or Firm* — Lee, Hong, Degerman, Kang & Waimey

(57) ABSTRACT

The present invention provides a method for a terminal and a base station including multiple TRPs to transmit/receive signals, and a device therefor. More particularly, the present invention provides a method whereby, if one or more base stations are present, and multiple TRPs are present in each of the base stations, a TRP for signal transmission/reception by a terminal and a base station is selected by using an uplink signal transmitted by the terminal, and a signal is transmitted/received based on the TRP. The present invention also provides a device for the method.

19 Claims, 12 Drawing Sheets

(51) Int. Cl.
   *H04W 52/02*    (2009.01)
   *H04W 72/04*    (2009.01)
   *H04W 72/08*    (2009.01)

(52) U.S. Cl.
   CPC ... *H04W 36/0069* (2018.08); *H04W 52/0216* (2013.01); *H04W 72/0413* (2013.01); *H04W 72/085* (2013.01)

(56) References Cited

U.S. PATENT DOCUMENTS

2018/0034515 A1*  2/2018  Guo ............... H04B 7/0404
   2018/0097590 A1*  4/2018  Ly ................. H04W 74/08
   2018/0109976 A1*  4/2018  Ly ................. H04L 1/005
   2018/0124733 A1*  5/2018  Vilaipornsawai ..... H04W 64/00
   2018/0227851 A1*  8/2018  Kubota ............ H04W 52/0229
   2019/0319686 A1* 10/2019  Chen, IV .......... H04W 72/046

OTHER PUBLICATIONS

Huawei, et al., "Short duration UL control channel design", 3GPP TSG RAN WG1 NR Ad-Hoc Meeting, R1-1700016, Jan. 2017, 6 pages.
Mediatek, "RRM enhancement in aid of UL signal", 3GPP TSG RAN WG1 Meeting #87, R1-1612141, Nov. 2016, 5 pages.

* cited by examiner

METHOD FOR TERMINAL AND BASE STATION INCLUDING MULTIPLE TRANSMISSION AND RECEPTION POINTS (TRP) TO TRANSMIT/RECEIVE SIGNALS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/001832, filed on Feb. 12, 2018, which claims the benefit of U.S. Provisional Application No. 62/457,164, filed on Feb. 10, 2017, the contents of which are hereby incorporated by reference herein in its entirety.

TECHNICAL FIELD

The present disclosure relates to a wireless communication system, and more particularly, to a method for a terminal and a base station including multiple transmission and reception points (TRPs) to transmit and receive a signal in a wireless communication system supporting various numerologies and device therefor.

More specifically, the present disclosure is directed to a method by which a base station measures uplink channel quality for multiple TRPs based on an uplink signal transmitted from a terminal and selects a TRP or a base station for transmitting and receiving a signal to and from the terminal and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide a method and device for transmitting and receiving a signal between a terminal and a base station including multiple TRPs in a newly proposed wireless communication system.

Specifically, the object of the present disclosure is to provide a method and device for selecting a TRP for signal transmission and reception between a terminal and a base station and transmitting and receiving a signal through the selected TRP in a newly proposed communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and device for transmitting and receiving a signal between a terminal (user equipment) and a base station including a plurality of TRPs in a wireless communication system.

In an aspect of the present disclosure, provided herein is a method of transmitting and receiving a signal to and from a user equipment (UE) through a plurality of transmission and reception points (TRPs) by a base station (BS) including the plurality of TRPs in a wireless communication system. The method may include: transmitting, to the UE, resource allocation information on an uplink signal for uplink channel quality measurement; receiving the uplink signal from the UE through each of the plurality of TRPs; measuring uplink channel quality for each of the TRPs using the received uplink signal; selecting a TRP to be used in transmitting and receiving the signal to and from the UE from among the plurality of TRPs based on the measured uplink channel quality; and transmitting, to the UE, a TRP selection command including information on the selected TRP.

The uplink signal for the uplink channel quality measurement may correspond to a sounding reference signal (SRS).

The signal transmission and reception method performed by the BS may further include periodically transmitting a paging message to the UE when the UE is in a radio resource control (RRC) Inactive state. The signal transmission and reception method may further include: configuring a time offset such that a reception period of the uplink signal is earlier by a predetermined time than a transmission period of the paging message and transmitting the time offset to the UE; and when there are a plurality of UEs, configuring a different time offset for each of the UEs and transmitting the different time offset to each of the UE.

The signal transmission and reception method performed by the BS may further include, when the selected TRP belongs to a neighboring BS, transmitting, to the UE, a BS (cell) selection command indicating handover to the neighboring BS.

The signal transmission and reception method performed by the BS may further include: receiving, from the UE, downlink channel quality information (CQI) on the BS and a neighboring BS; and determining whether to hand over the UE based on the downlink CQI. The downlink CQI may be received according to a downlink channel quality measurement report (MR) request transmitted by the BS, and the downlink channel quality MR request may be transmitted when the selected TRP belongs to the neighboring BS. When the UE is configured not to perform downlink channel quality measurement periodically, the downlink channel quality MR request may include resource allocation information for the downlink channel quality measurement. When the UE is configured to perform downlink channel quality measurement periodically and a downlink channel quality measurement result of the UE satisfies a predetermined criterion, the downlink CQI may be received. A downlink channel quality measurement period may be equal to a transmission period of a paging message transmitted to the UE when the UE is in a radio resource control (RRC) Inactive state.

The signal transmission and reception method performed by the BS may further include transmitting, to the UE, a timing advance command for synchronizing reception times of the uplink signal. The uplink signal may be allocated over N orthogonal frequency division multiplexing (OFDM) symbol durations on uplink resources. The uplink signal may be fully transmitted by the UE during the N OFDM symbol durations and received by the plurality of TRPs. In this case, N may be a positive real number. The timing advance command may include acknowledgement (ACK) information for the uplink signal.

According to the signal transmission and reception method performed by the BS, when the BS transmits no timing advance command to the UE and allocates a sounding reference signal (SRS) over N orthogonal frequency division multiplexing (OFDM) symbol durations on uplink resources, the uplink signal may be partially transmitted by the UE during L OFDM symbol durations and received by the plurality of TRPs, where N is a positive real number and L is a positive real number smaller than N.

According to the signal transmission and reception method performed by the BS, when there are a plurality of UEs, uplink signals for the uplink channel quality measurement at the plurality of UEs may be multiplexed and allocated over N orthogonal frequency division multiplexing (OFDM) symbol durations on uplink resources in a comb-type manner, where N is a positive integer.

In another aspect of the present disclosure, provided herein is a method of transmitting and receiving a signal to and from a base station (BS) including a plurality of transmission and reception points (TRPs) by a user equipment (UE) in a wireless communication system. The method may include: receiving, from the BS, resource allocation information on an uplink signal for uplink channel quality measurement; transmitting the uplink signal to the BS based on the resource allocation information; and attempting to receive a TRP selection command including information on a TRP to be used in transmitting and receiving the signal to and from the BS.

The signal transmission and reception method performed by the UE may further include, when the UE is in a radio resource control (RRC) Inactive state, periodically receiving a paging message from the BS. When the UE successfully receives the TRP selection command, when the UE fails to receive the TRP selection command and a reception period of the paging message elapses, or when the UE receives, from the BS, a command for switching to a sleep mode, the UE may switch to the sleep mode.

In a further aspect of the present disclosure, provided herein is a base station (BS) for transmitting and receiving a signal to and from a user equipment (UE) through a plurality of transmission and reception points (TRPs). The BS may include: a transmitter configured to communicate with the UE through the plurality of TRPs; a receiver configured to communicate with the UE through the plurality of TRPs; and a processor. The processor may be configured to: control the transmitter to transmit, to the UE, resource allocation information on an uplink signal for uplink channel quality measurement; control the receiver to receive the uplink signal from the UE through each of the plurality of TRPs; measure uplink channel quality for each of the TRPs using the received uplink signal; select a TRP to be used in transmitting and receiving the signal to and from the UE from among the plurality of TRPs based on the measured uplink channel quality; and control the transmitter to transmit, to the UE, a TRP selection command including information on the selected TRP.

It will be understood by those skilled in the art that the above-described aspects of the present disclosure are merely part of the embodiments of the present disclosure and various modifications and alternatives could be developed from the following technical features of the present disclosure.

Advantageous Effects

As is apparent from the above description, the embodiments of the present invention have the following effects.

According to the present disclosure, a BS including a plurality of TRPs may transmit and receive a signal to and from a UE using a TRP suitable for signal transmission and reception.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
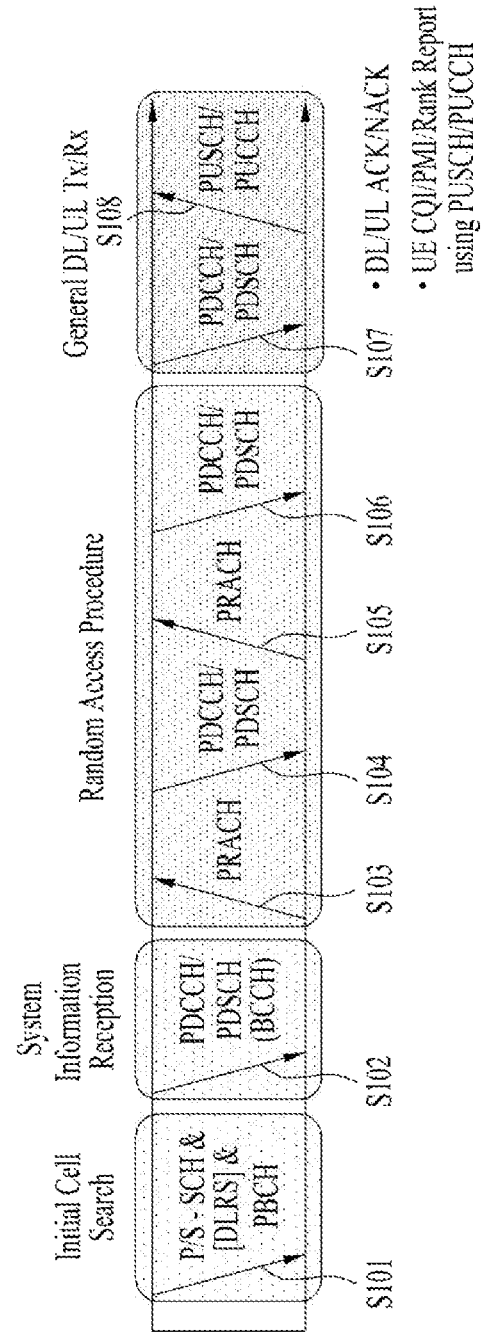
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service, and a reception end is a fixed and/or mobile node that receives a data service or a voice service. Therefore, in uplink (UL) transmission, a UE may serve as a transmission end, and a BS may serve as a reception end. Likewise, in downlink (DL) transmission, a UE may serve as a reception end, and a BS may serve as a transmission end.

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
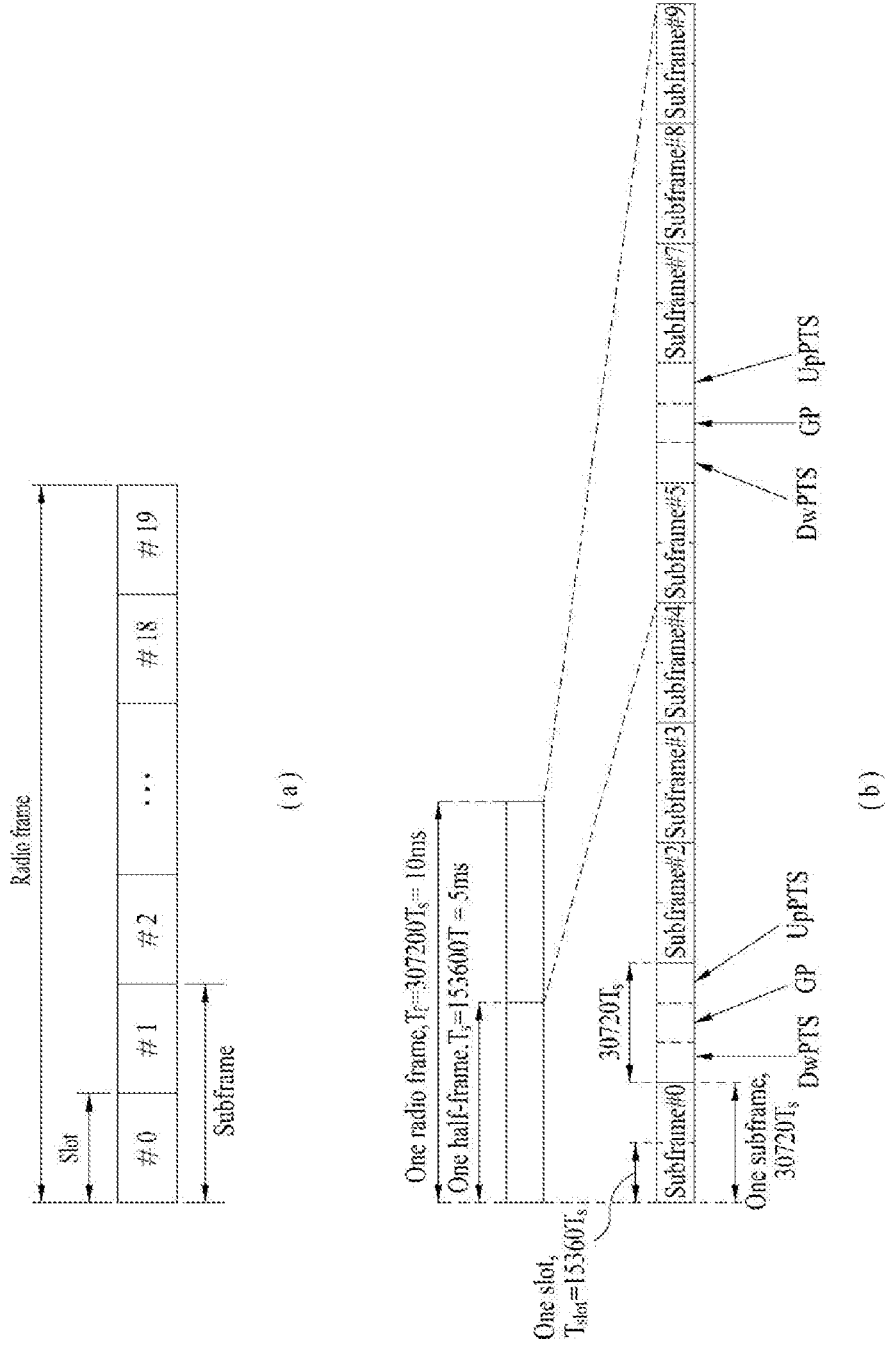
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
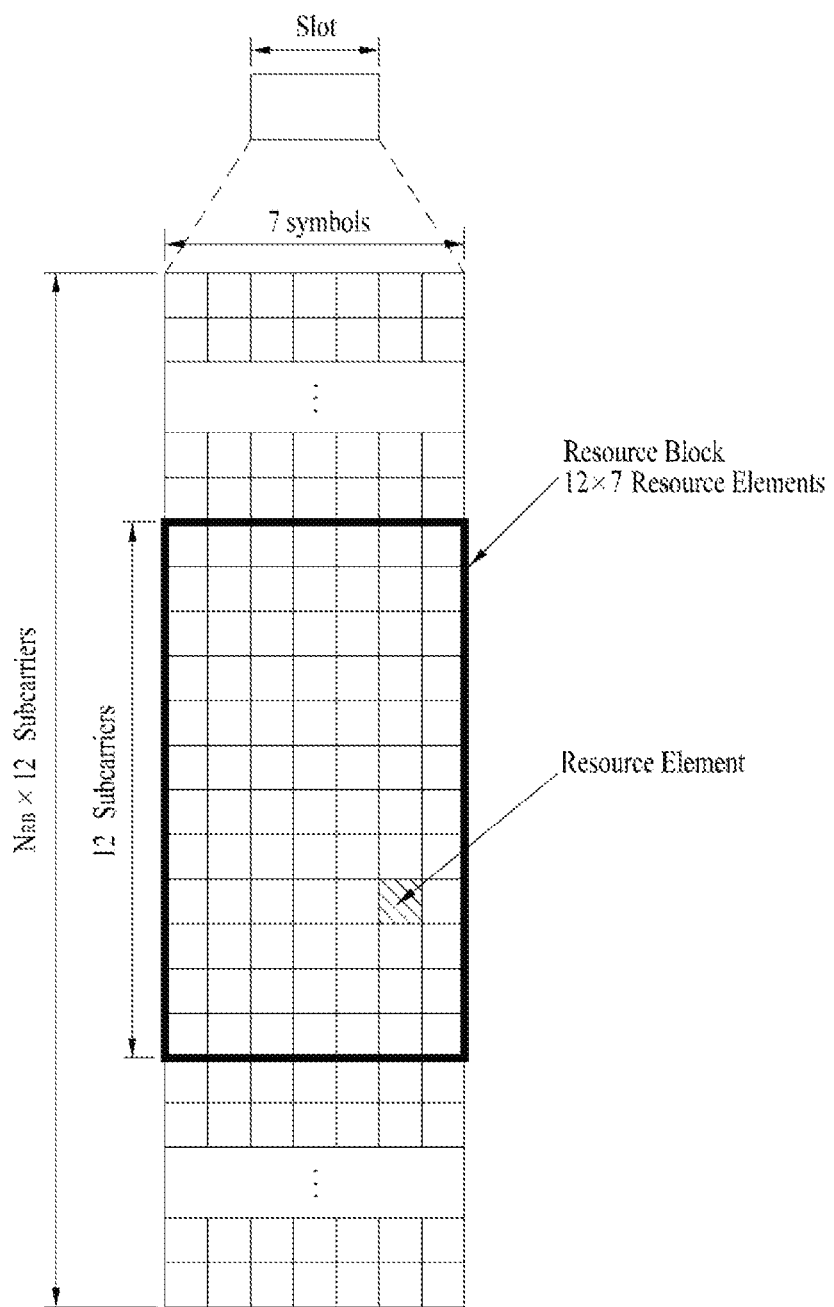
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of a UL slot may be the same as that of the DL slot.

Figure 4:
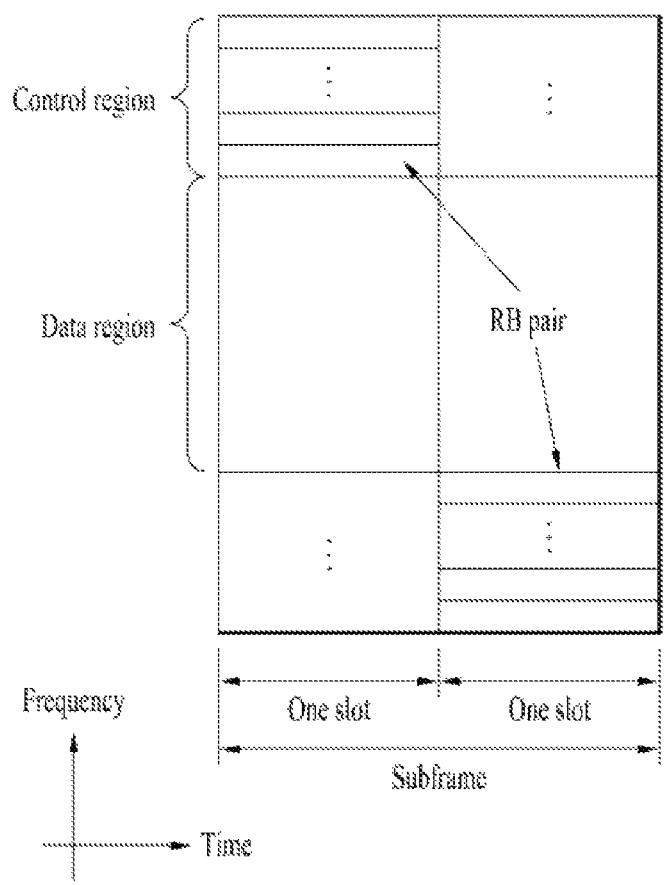
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
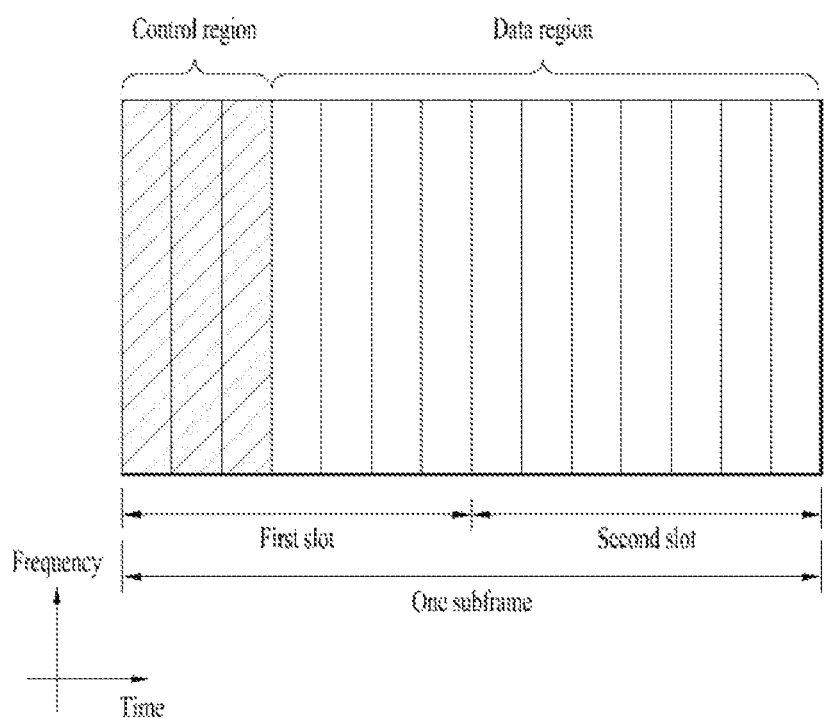
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals R0 shall be used. For RSRP determination, the cell-specific reference signals R0 shall be used. If the UE can reliably detect that R1 is available, it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire DL system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

1.5 Coordinated Multi-Point (CoMP)

To satisfy enhanced system performance requirements of the 3GPP LTE-A system, CoMP transmission and reception technology (also called co-MIMO, collaborative MIMO or network MIMO) has been proposed. The CoMP technology may increase the performance of a UE located at a cell edge and the average sector throughput.

In a multi-cell environment with a frequency reuse factor set to 1, the performance of a UE located at a cell edge and the average sector throughput may be lowered due to inter-cell interference (ICI). To mitigate ICI, the legacy LTE system has adopted a simple passive technique such as fractional frequency reuse (FFR) based on UE-specific power control such that the UE located at the cell edge may have appropriate throughput and performance in an environment where the UE is constrained by interference. However, mitigating the ICI or reusing ICI as a UE's desired signal may be more desirable than reducing the amount of frequency resources per cell. To this end, a CoMP transmission technique may be employed.

CoMP schemes available for DL transmission may be classified into a joint processing (JP) scheme and a coordinated scheduling/beamforming (CS/CB) scheme.

According to the JP scheme, each transmission point (BS) in a CoMP cooperation unit can use data. The CoMP cooperation unit refers to a set of BSs participating in CoMP transmission. The JP scheme may be further divided into a joint transmission scheme and a dynamic cell selection scheme.

The joint transmission scheme means a technique where PDSCHs are simultaneously transmitted from a plurality of points (some or all transmission points in a CoMP cooperation unit). That is, a plurality of transmission points may simultaneously transmit data to a single UE. According to the joint transmission scheme, the quality of a received signal may be coherently or non-coherently improved, and interference between UEs may be actively eliminated.

The dynamic cell selection scheme is a technique where a PDSCH is transmitted from one point (in a CoMP cooperation unit) at a time. That is, one point transmits data to a single UE at a given time point, while other points in the CoMP cooperation unit do not transmit data to the UE at the time point. In this case, a point that transmits data to a UE may be dynamically selected.

Meanwhile, in the CS/CB scheme, CoMP cooperation units may cooperatively perform beamforming for data transmission to a single UE. Although data is transmitted only from a serving cell, user scheduling/beamforming may be determined by coordination between cells in a CoMP cooperation unit.

In the case of UL, CoMP reception means that a signal is received through cooperation between multiple geographically separated points. CoMP schemes available for UL transmission may be classified into a joint reception (JR) scheme and a coordinated scheduling/beamforming (CS/CB) scheme.

In the JR scheme, a plurality of reception points receive a signal transmitted over a PUSCH. In the CS/CB scheme, although only one point receives a PUSCH, user scheduling/beamforming is determined by coordination between cells in a CoMP cooperation unit.

In such a CoMP system, multi-cell BSs may jointly provide data to a UE. In addition, each BS may simultaneously support at least one UEs using the same radio frequency resources, thereby increasing system performance. Moreover, the BS may perform space division multiple access (SDMA) based on CSI between the BS and UE.

In the CoMP system, a serving BS and at least one cooperative BSs are connected to a scheduler over a backbone network. Each BS may measure channel states between the cooperative BSs and UEs and then provide information on the channel states to the scheduler over the backbone network. For example, the scheduler may schedule information on cooperative MIMO operation for the serving BS and one or more cooperative BSs. That is, the scheduler may directly instruct each BS to perform the cooperative MIMO operation.

As described above, the CoMP system may be regarded as a virtual MIMO system where a plurality of cells are grouped into one group. Basically, the CoMP system may adopt a MIMO communication scheme using multiple antennas.

Figure 6:
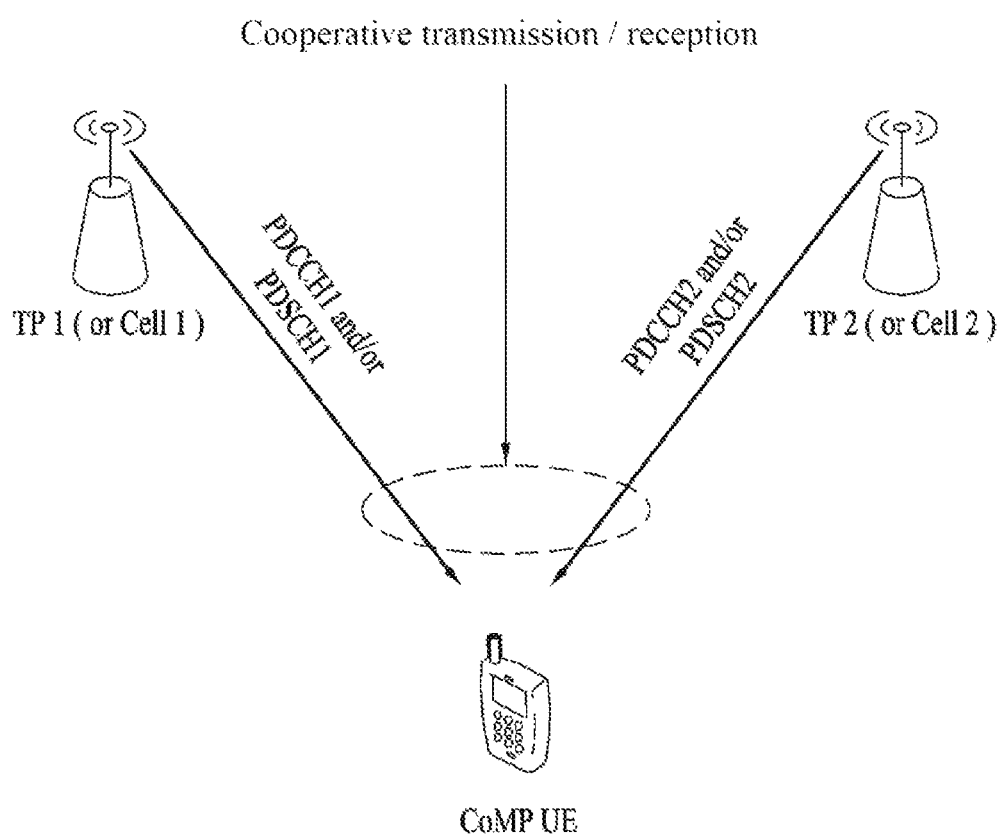
FIG. 6 is a diagram illustrating that different transmission points or cells perform cooperative transmission for a UE.

Among the above-described CoMP schemes, the dynamic cell selection scheme will be described in detail with reference to FIG. 6. FIG. 6 illustrates that different transmission points or cells perform CoMP transmission for a UE. In general, according to the CoMP scheme, one transmission point (e.g., TP1) transmits a PDCCH, and another transmission point (e.g., TP2) may transmit data associated with the PDCCH. A transmission point for transmitting data (e.g., a PDSCH, a codeword, a transport block, etc.) may be indicated using the CIF field of a DCI format. The transmission point for transmitting data may be dynamically changed according to change in the channel environment.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Numerologies

The NR system to which the present disclosure is applicable supports various OFDM numerologies as shown in Table 2 below. The value of $\mu$ and cyclic prefix information per carrier bandwidth part can be signaled for DL and UL, respectively. For example, the value of $\mu$ and cyclic prefix information for DL carrier bandwidth part may be signaled though higher layer signaling such as DL-BWP-mu and DL-MWP-cp. As another example, the value of $\mu$ and cyclic prefix information for UL carrier bandwidth part may be signaled though higher layer signaling such as UL-BWP-mu and UL-MWP-cp.

TABLE 2

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2. Frame Structure

DL and UL transmission are configured with frames each having a length of 10 ms. Each frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each frame may include two half-frames with the same size. In this case, the two half-frames may include subframes 0 to 4 and subframes 5 to 9, respectively.

Regarding the subcarrier spacing $\mu$, slots may be numbered within one subframe in ascending order as follows: $n_s^{\mu} \in \{0, \ldots, N_{slot}^{subframe,\mu} - 1\}$ and may also be numbered within a frame in ascending order as follow: $n_{s,f}^{\mu} \in \{0, \ldots, N_{slot}^{frame,\mu} - 1\}$. In this case, the number of consecutive OFDM symbols in one slot ($N_{symb}^{slot}$) may be determined as shown in Tables 3 and 4 below according to the cyclic prefix. The start slot ($n_s^{\mu}$) of a subframe is aligned with the start OFDM symbol ($n_s^{\mu} N_{symb}^{slot}$) of the corresponding subframe in the time domain. Table 3 shows the number of OFDM symbols in each slot/frame/subframe in the case of a normal cyclic prefix, and Table 4 shows the number of OFDM symbols in each slot/frame/subframe in the case of an extended cyclic prefix.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

The NR system to which the present disclosure is applicable may employ a self-contained slot structure as the above-described slot structure.

Figure 7:
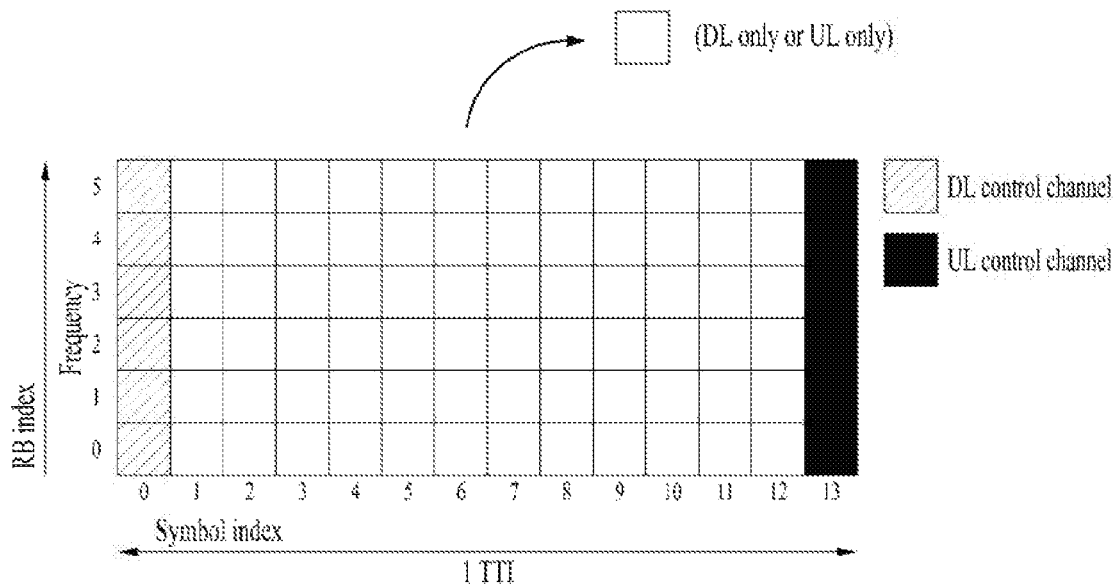
FIG. 7 is a diagram illustrating a self-contained subframe structure applicable to the present invention.

FIG. 7 is a diagram illustrating a self-contained subframe structure applicable to the present disclosure.

In FIG. 7, the hatched area (e.g., symbol index=0) represents a DL control region, and the black area (e.g., symbol index=13) represents a UL control region. The other area (e.g., symbol index=1 to 12) may be used for DL or UL data transmission.

Based on the self-contained slot structure, a BS and a UE may sequentially perform DL transmission and UL transmission in one slot. That is, the BS and the UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and the UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 7.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
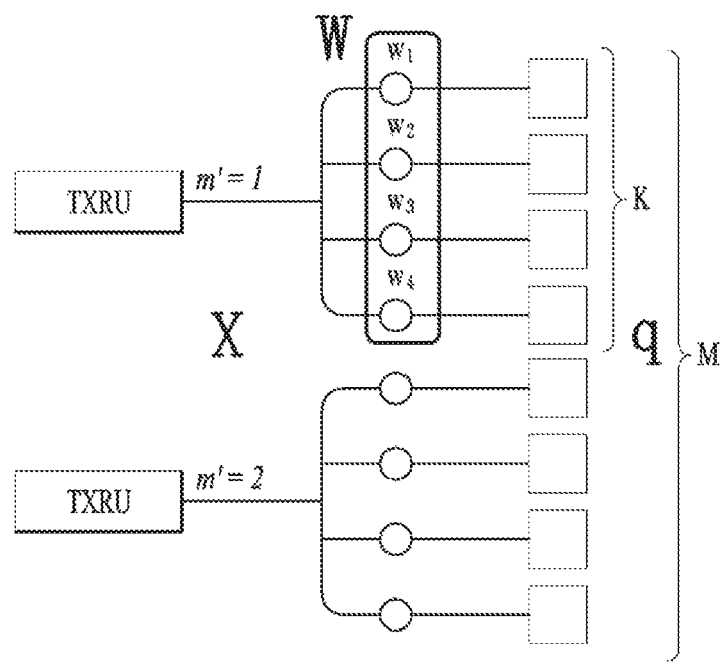
FIGS. 8 and 9 are diagrams illustrating representative methods for connecting TXRUs to antenna elements.
Figure 9:
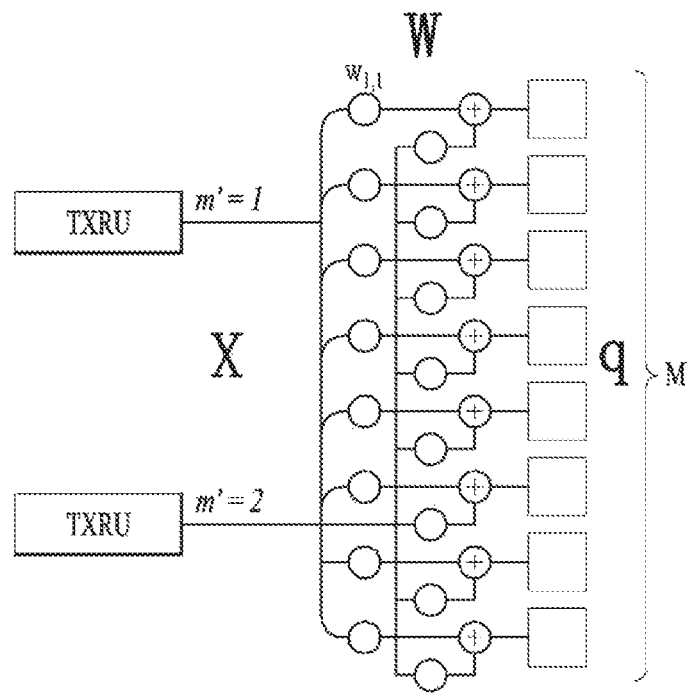

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to sub-arrays. In FIG. 8, one antenna element is connected to one TXRU.

Meanwhile, FIG. 9 shows a method for connecting all TXRUs to all antenna elements. In FIG. 9, all antenna element are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 10:
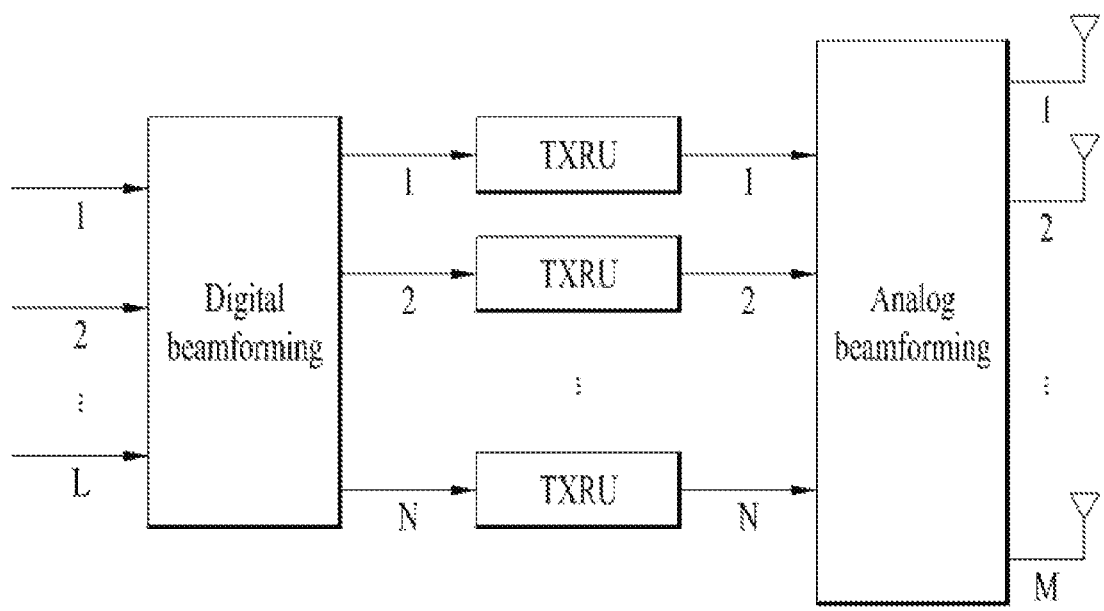
FIG. 10 is a diagram schematically illustrating an exemplary hybrid beamforming structure from the perspective of transceiver units (TXRUs) and physical antennas according to the present invention.

FIG. 10 is a diagram schematically illustrating an exemplary hybrid BF structure from the perspective of TXRUs and physical antennas according to the present invention. In FIG. 10, the number of digital beams is L and the number analog beams is N.

Additionally, in the NR system to which the present invention is applicable, an eNB designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present invention considers introducing a plurality of antenna panels to which independent hybrid BF is applicable.

In the case in which the eNB utilizes a plurality of analog beams as described above, the analog beams advantageous for signal reception may differ according to a UE. Therefore, in the NR system to which the present invention is applicable, a beam sweeping operation is being considered in which the eNB transmits signals (at least synchronization signals, system information, paging, and the like) by applying different analog beams in a specific subframe (SF) on a symbol-by-symbol basis so that all UEs may have reception opportunities.

Figure 11:
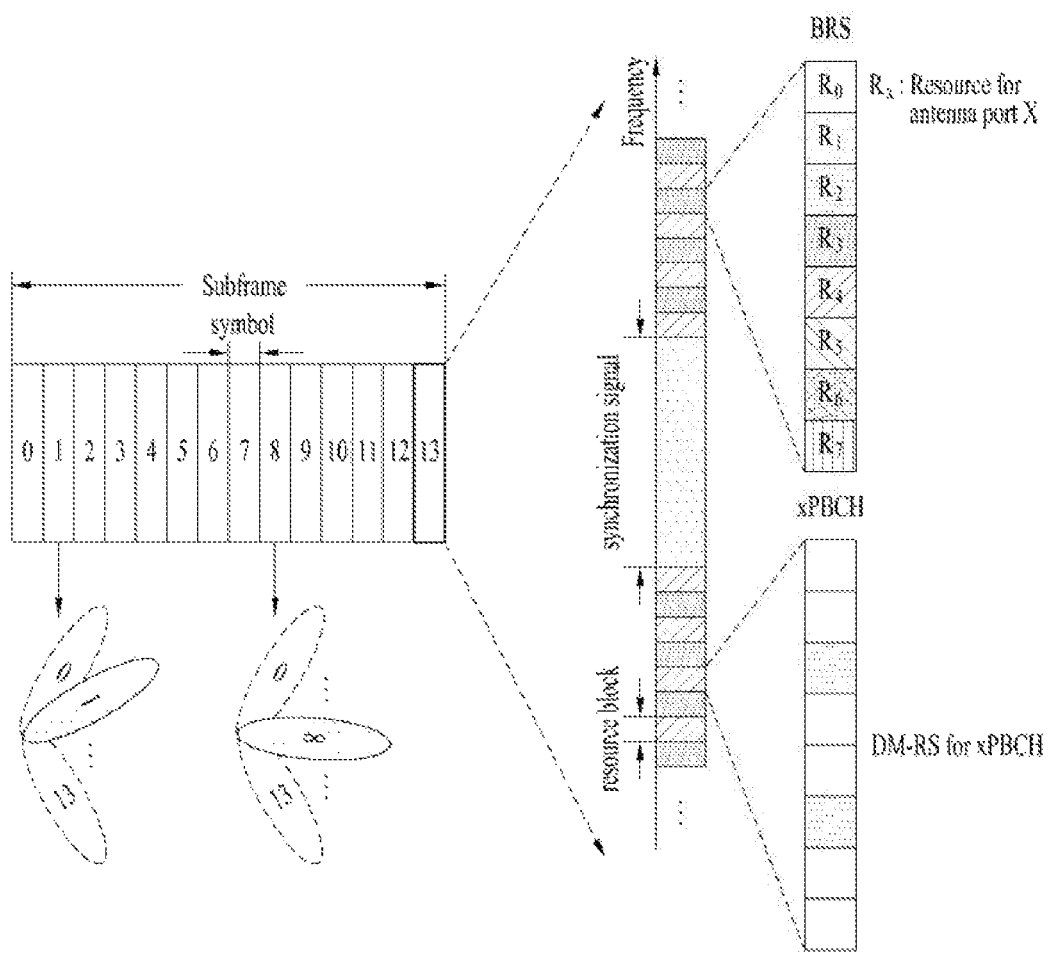
FIG. 11 is a diagram schematically illustrating an exemplary beam sweeping operation for a synchronization signal and system information in a downlink (DL) transmission procedure according to the present invention.

FIG. 11 is a diagram schematically illustrating an exemplary beam sweeping operation for a synchronization signal and system information in a DL transmission procedure according to the present invention.

In FIG. 11 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 11, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

3. Proposed Embodiments

Based on the above-described technical features, a description will be given of a method for signal transmission and reception between a BS and a UE in a wireless communication system with multiple distributed antennas (e.g., a transmission and reception point (TRP), a remote radio head (RRH), a relay, etc.). Specifically, a method by which a BS or UE measures the channel quality of a signal transmitted or received through multiple distributed antennas and performs signal transmission and reception based on the measured channel quality and device therefor will be described in detail. In addition, a method by which a BS or UE selects a distributed antenna for transmitting and receiving a signal with another BS or UE based on measured channel quality and performs signal transmission and reception using the selected distributed antenna and device therefor will also be described. Herein, a distributed antenna may be called a TRP and vice versa. When it is said in the specification and claims that a BS transmits a signal to a UE or vice versa, it may be interpreted to mean that the BS transmits the signal to the UE through a distributed antenna or vice versa. When it is said that a BS/UE receives a signal, the same interpretation may be applied.

In the legacy LTE system, there have been many needs for techniques capable of increasing system throughput per unit area to handle rapidly increasing traffic. The CoMP is one of these techniques, and in addition to the CoMP, various data transmission techniques (i.e., signal transmission and reception technologies) based on distributed antennas have been introduced.

Meanwhile, it is expected that the 5G or NR wireless communication system will use higher frequency bands than currently used frequency bands. In addition, considering the degree of signal diffraction in high frequency bands, it is also expected that the number of distributed antennas included in one BS will further increase.

In such an environment, it is necessary to reduce the amount of network resources used for a paging signal, which is transmitted by a BS to a UE in the inactive state (radio resource control (RRC) Inactive state). In addition, it is also necessary to improve the efficiency of network resources used by a BS and a UE in active state (RRC-Connected state) or inactive state. That is, when a specific UE transmits and receives a signal to and from a plurality of TRPs, the UE may require distributed antenna (TRP) selection and BS (cell) selection where the channel quality between each BS/TRP and the UE is reflected.

The RRC-Inactive state, which is different from the RRC-Connected state and the RRC-Idle state, can be defined in the new wireless communication system as shown in Table 5.

TABLE 5

RRC_INACTIVE:
A UE specific DRX may be configured by upper layers or by RRC layer;
UE controlled mobility based on network configuration;
The UE stores the AS context;
The UE:
Monitors a Paging channel;
Performs neighbouring cell measurements and cell (re-)selection;
Performs RAN-based notification area updates when moving outside the RAN-based notification area;
Acquires system information.

In the legacy wireless communication system (e.g., WCDMA, LTE, etc.), one BS generally has one or few TRPs. Even when there are multiple TRPs, the distributed antenna system is (transparently) configured such that a UE is capable of obtaining information on the TRPs. Thus, even though the UE measures channel quality for each TRP, the amount of overhead is negligible. For this reason, the UE may measure the channel quality based on signals received from the BS and TRPs thereof and then report the measured channel quality to the BS in the legacy wireless communication system. Even when the UE is handed over into another BS, the UE may measure DL channel quality.

However, when the number of TRPs belonging to one BS increases over a certain level, a large amount of overhead may occur if a UE measures channel quality based on DL signals from the TPRs, and the large amount of overhead may cause the following problems: increase in computation complexity, speed degradation, and increase in power consumption.

In addition, considering that a BS uses all TRPs to transmit a paging message to a UE located in a paging zone, the efficiency of network resources may be significantly degraded. As the number of TRPs belonging to a BS increases over a certain level, the number of UEs connected to the BS also increases, and as a result, the efficiency degradation may become more prevalent.

For these reasons, a method by which a BS measures UL channel quality (RSRP, RSRQ, RSSI, etc.) for TRP selection needs to be discussed, instead of allowing a UE to perform DL channel quality measurement. In addition, a method of efficiently using network resources for transmitting a paging signal over a paging channel when a UE is inactive also needs to be discussed.

Accordingly, the present disclosure proposes a channel quality measurement method, TRP selection method, and a BS selection method in order to reduce the calculation complexity of a UE, support UE mobility, and use network resources efficiency in a wireless communication environment where a plurality of TRPs belong to one BS and device therefor. In addition, the present disclosure describes the configuration of a UL physical channel used for the method and device.

3.1. System Management Environment

Figure 12:
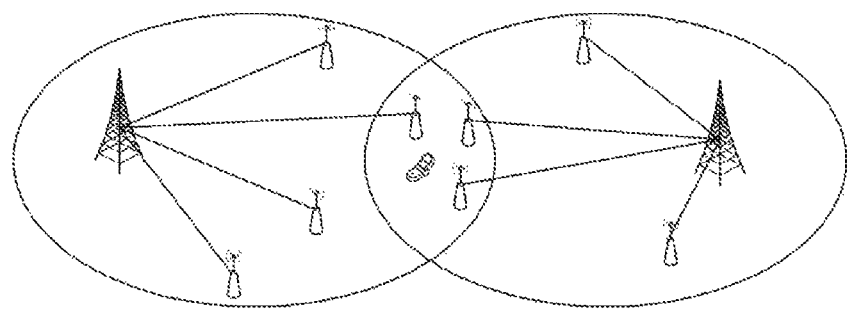
FIG. 12 is a diagram illustrating an environment for managing a wireless communication system according to an embodiment of the present disclosure.

FIG. 12 illustrates a wireless communication system according to an embodiment of the present disclosure.

Referring to FIG. 12, one UE may communicate with at least one TRP within coverage of multiple BSs. When the UE is capable of communicating with multiple TRPs, some of the multiple TRPs may belong to different BSs, and other TRPs may belong to the same BS. Further, each TRP may correspond to a cell.

In this case, each TRP may be configured to transmit one beam in a specific direction or implement one beam group to transmit multiple beams in the specific direction. The beam/beam group selection method, which will be described later, may be applied when one TRP has one beam or one beam group.

Hereinafter, the TRP selection method will be described.

First, a BS allocates a resource for transmitting a UL signal defined for TRP selection to a UE, and the UE transmits the UL signal defined for the TRP selection on the resource.

All TRPs within a prescribed area perform channel quality measurement for the UL signal transmitted by the UE. In this case, the prescribed area may correspond to an area configured to cover TRPs that can communicate with the UE or a random area configured by the BS.

The BS or a network entity configured to select a TRP, which is at a level higher than the BS, receives channel quality measurement results (also called UL channel quality information or UL received signal quality information) from the TRPs within the prescribed area. The BS or network entity selects a specific TRP from among the TRPs based on the channel quality measurement results and determines the specific TRP as a TRP for communication between the BS and UE. The specific TRP may be a TRP with the best channel quality measurement result. Alternatively, the specific TRP may be determined by considering not only the channel quality measurement results but also other elements necessary for network management.

Next, the BS (cell) selection method, which is proposed to support UE mobility, will be described. Here, supporting the UE mobility may be interpreted to mean that handover between BSs is supported when a UE is in the active state and reception of a paging message is supported when a UE is in the inactive state.

According to the BS selection method proposed in the present disclosure, a BS may be selected by considering a DL channel quality measurement result (also called DL channel quality information or DL received signal quality information), which a UE reports to a BS by measuring the quality of a received DL signal, as well as UL channel quality information (CQI) received by a BS or a network entity, which is described in the TRP selection method. Whether either or both the UL CQI and DL CQI are used may be determined according to the network configuration.

The CQI described herein is not limited to 'information indicating the quality of a DL data channel' defined in the LTE system.

Specifically, each of the UL CQI and DL CQI may include not only the above-described RSRP and RSRQ but also various information for indicating a channel state between a BS and a UE such as a signal-to-noise ratio (SNR), an effective SNR, etc. In addition, it may be replaced with the terms "communication quality information, "signal quality information", "RRM measurement information", etc.

Hereinafter, the TRP and BS selection methods and the structure of a physical channel for the TRP and BS selection methods will be described in further detail.

3.2. Signal for UL Channel Quality Measurement

Figure 13:
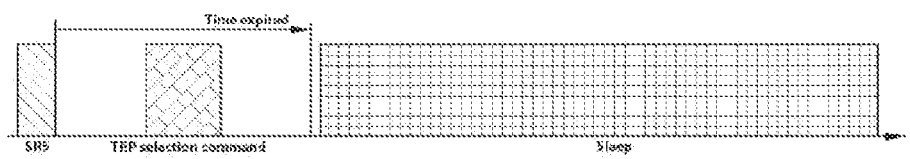
FIG. 13 is a diagram illustrating a TRP selection method based on uplink channel quality measurement according to an embodiment of the present disclosure.

FIG. 13 illustrates TRP selection and BS selection methods based on UL channel quality measurement according to an embodiment of the present disclosure, which are available when a UE is inactive.

Referring to FIG. 13, a UL RS is configured such that a distributed antenna is allowed to measure UL channel quality periodically. A BS allocates resources of a physical channel for transmitting the UL signal to a UE.

According to the present disclosure, one UL signal may be selected from among multiple UL signals transmitted from a UE to a BS by considering a wireless communication environment, and then the selected UL signal may be used for the UL channel quality measurement. Although a sounding reference signal (SRS) is taken as an example of a UL RS transmitted on a physical channel for the UL channel quality measurement, the present disclosure is not limited thereto. For example, when a UE is in the active state (RRC-Connected state), an RS used for link adaptation may be used instead of the SRS, that is, for the UL channel quality measurement.

The SRS is a signal that all TRPs within a certain area can receive from a UE, and thus, the SRS may be used by all TRPs within the certain area in performing the UL channel quality measurement.

Specifically, the UE periodically transmits the SRS on resources allocated by a BS. When the BS does not establish an SRS configuration including the SRS transmission resources, the UE may perform DL channel quality measurement without performing the SRS transmission.

When the UE transmits the SRS periodically, all TRPs within the certain area measure UL channel quality using the received SRS. Then, all TRPs within the certain area transmit the measured UL CQI to a BS or a network entity that performs TRP selection.

The BS or network entity selects a specific TRP from among all TRPs within the certain area based on the received UL CQI and then set the specific TRP as a TRP for communication between the BS and UE. The specific TRP may be a TRP with the best UL channel quality measurement result. Alternatively, the specific TRP may be an optimal TRP in terms of network management. In this case, the criteria for determining the optimal TRP may include not only the UL CQI but also other elements necessary for the network management.

In the above process, the UE may require information on the determined TRP (second TRP information) to update information on the currently connected TRP (first TRP information). That is, the UE may receive the second TRP information from the BS. After receiving the second TRP information, the UE may communicate with the BS using the second TRP information.

The second TRP information may be transmitted to the UE through a TRP which has communicated with the UE before the TRP selection. Alternatively, the second TRP information may be transmitted to the UE through the TRP determined during the TRP selection. Further, the second TRP information may be transmitted to the UE through a random TRP based on the first TRP information.

When the UE requires the TRP information to communicate with the network as described above, the UE needs to receive the result of the TRP selection from the BS or network entity. To this end, when transmitting resource allocation information for the SRS transmission to the UE, the BS may further transmit information for allowing the UE to attempt to receive the second TRP information including a TRP selection command during a predetermined time after the UE transmits the SRS. Assuming that the UE is in the inactive state, the UE attempts to receive the TRP selection command during the predetermined time after transmitting the SRS. When the UE receives the TRP selection command or when the UE no longer attempts to receive a paging message after lapse of the predetermined time configured for the TRSP selection command reception, the UE may enter sleep mode.

If the UE does not require the TRP information, that is, if the UE is capable of receiving the paging message through the same TRP based on the first TRP information after the BS completes the TRP selection, the BS may not transmit the TRP selection command to the UE.

If the UE is configured to attempt to receive the paging message periodically in the inactive state, the BS needs to consider a paging message reception time when configuring an SRS transmission period. In other words, the BS may align the SRS transmission period with the paging message reception time.

For example, the BS may set the SRS transmission period of the UE to be earlier than a paging message reception period to align the SRS transmission period with the paging message reception time. From the perspective of the BS, the period of receiving the SRS from the UE (SRS reception period) may be set to be earlier than the paging message transmission period. In this case, the paging message reception period may be configured to become a sub-set of the SRS transmission period. That is, the paging message reception period may be set to be equal to or longer than the SRS transmission period. In addition, the paging message reception period may be a multiple of the SRS transmission period.

Preferably, a UE's SRS transmission time determined by the SRS transmission period may be configured such that it is earlier by a predetermined time than the UE's paging message reception time. By doing so, the UE may receive the paging message from the TRP determined during the TRP selection. The time difference between the UE's SRS transmission time and the UE's paging message reception time is defined as a time offset (T_offset).

The BS needs to determine the time difference between the UE's SRS transmission time and paging message reception time, i.e., the time offset by considering a time required for transmitting a timing advance (TA) command or the second TRP information.

In this case, if the BS or network entity assigns the same paging message reception time or the same SRS transmission time to a predetermined number of UEs or more, DL/UL resources to be used by the predetermined number of UEs or more may become insufficient.

To solve this problem, the time offset for each UE may be configured through time randomization such that the SRS transmission time and paging message reception time is different configured for each UE.

In summary, a UE wakes up at a time determined by a BS or network entity and then transmits an SRS. Then, the UE attempts to receive second TRP information and update first TRP information during a predetermined time. Next, the UE attempts to receive a paging message using the first or second TRP information depending on whether the update is performed. While attempting to update TRP information, the UE may also attempt channel quality measurement for a neighboring BS or a serving BS in order to secure its mobility.

3.3. Configuration and Application of SRS and TA Command

According to the present disclosure, an SRS is used to measure UL channel quality for TRP selection. Thus, if a UE is in the active state (RRC-Connected state), an RS used for link adaptation may be used instead of the SRS, that is, for UL channel quality measurement.

Since the SRS is used to select a TRP or a BS as described above, the SRS should be received by all of one or more neighboring TRPs (or one or more BSs) that participate in TRP selection.

Thus, when an RS for UL link adaptation is used for the same purpose as the SRS, a channel (or signal) may be obtained and used by changing the structure of the RS for UL link adaptation partially instead of using the RS for UL link adaptation as it is. Alternatively, a channel (or signal) which has the same structure as the RS for UL link adaptation but is transmitted on a different resource from the RS for UL link adaptation may be used.

When the UE is in the activate state (RRC_Connected state), the SRS transmission period or time of the UE may be configured by considering the movement speed of the UE. When the UE is in the inactivate state, the SRS transmission period or time of the UE may be configured by considering the movement speed of the UE or the paging message reception period and time of the UE.

When the UE is in the inactivate state, the SRS transmission/reception period and time, the paging transmission/reception period and time, and the reception time of a TRP selection command (or handover command) included in second TRP information should be explicitly defined within a predetermined time window such that the SRS transmission time is earlier than the paging message reception time or the paging message reception period is included in the SRS transmission period (here, the time window may mean a time period from the SRS transmission time to the paging message reception time or a time period from the SRS transmission time to a prescribed time, which is later than the paging message reception time). The configuration of each time within the time window may be predetermined by the BS or network entity and stored in the UE. Alternatively, the BS or network entity may determine the configuration of each time within the time window during the TRP or BS selection and then inform the UE of the configuration. When the UE is in the inactive state, the time window may relate to the paging message reception time. Specifically, the paging message reception time may be used as the time window.

When the UE transmits the SRS in the active state (RRC_Connected state), the UE may apply a TA command thereto. That is, the UE may receive the TA command from the BS before transmitting the SRS.

However, when the UE is in the inactive state, the UE communicates with a serving BS intermittently by repeating sleep and wake-up operations. Thus, it may be difficult for the UE to maintain the optimal TA value when the UE transmits the SRS. By considering not only this problem but also the network environment and management, the BS may determine whether the UE applies a TA value included in the TA command received from the BS or a fixed TA value (including zero) in order to transmit the SRS.

For example, if the network operates based on a cell with a very small radius, a round-trip delay between the BS and UE may not significantly affect another UE's UL signal transmission performance. In this case, the BS may configure and maintain the fixed or minimum TA for the UE.

Figure 14:
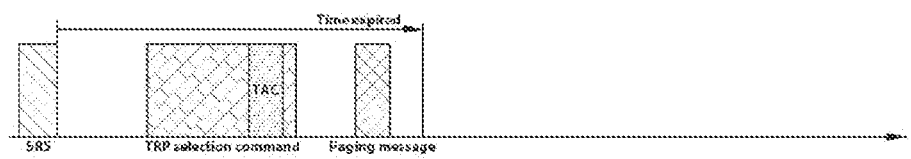
FIG. 14 is a diagram illustrating a TRP selection method based on uplink channel quality measurement according to another embodiment of the present disclosure.

Meanwhile, considering the channel environment and BS management, the BS or network entity may need to adjust the TA value of the UE through the TA command for each wake-up time in order to maintain the UL signal reception performance over a certain level. When determining such adjustment, the BS or network entity transmits the TA command to the UE during the time window configured after the SRS transmission. In this case, the TA command may be transmitted together with the TRP selection command or a BS (cell) selection command FIG. 14 illustrates an example of when a UE transmits an SRS and receives a paging message, a TAC, and a TRP selection command according to the above-described method.

After a UE transmits an SRS, a BS may always transmit a TA command to a UE. Thus, the UE may expect that the TA command will be transmitted from the BS. If the UE fails to receive the TA command more than a predetermined number of times (or during a predetermined time), the UE may determine that there is a problem in a UL or DL channel Thus, when the UE expects that the TA command will be received after the SRS transmission, the UE may regard the TA command as an ACK signal for the SRS signal transmission. If the UE fails to receive the TA command during the predetermined time (or more than the predetermined number of times), the UE may perform a procedure for reconstructing channel quality by determining that the quality of the UL or DL channel is degraded so that the UE cannot perform any operation (quality check or tracking failure check).

The symbol duration for SRS transmission may be defined as N OFDM symbols depending on the BS management. The value of N may be configured by the BS. N may set to an integer greater than 0, a real number greater than 0, or a real number between 0 and 1.

In this case, if the BS determines that the SRS reception time is well aligned with its expected time by the TA command or there is no problem even if the UE uses a fixed TA value, the BS may instruct the UE to perform full transmission during the symbol duration configured for the SRS transmission.

However, when the UE uses a fixed TA value or the BS does not transmit the TA command, the SRS reception time may not be aligned with the BS's expected time, and as a result, the system performance may be degraded. To overcome this problem, the BS may instruct the UE to transmit the SRS using some symbols in the defined symbol duration. For example, the transmission power of some samples in the symbol duration defined for the full transmission may be masked out with 0. Whether the UE should perform the full transmission or partial transmission may be preconfigured. Alternatively, the BS may inform the UE whether the UE needs to perform the full transmission or partial transmission through RRC signaling when instructing the UE to perform the SRS transmission.

Meanwhile, the BS needs to allocate UL resources for the SRS transmission to each UE in a UE-specific (or UE-dedicated) manner Since the number of UEs connected to a BS increases as the number of TRPs belonging to the BS increases, a resource multiplexing method therefor needs to be considered.

In the LTE and NR systems, the time division multiplexing (TDM) and frequency division multiplexing (FDM) have been considered for RS multiplexing between users. In addition, a method of allocating a difference sequence to each cell and UE has also been considered.

According to the present disclosure, an SRS sequence is allocated to each region for TRP selection for resource multiplexing, and each SRS sequence is mapped to frequency. To maintain the efficiency of the user multiplexing and the single carrier property in the case of SC-FDMA, each SRS sequence may be mapped in a comb-type manner in the frequency domain.

When frequency-domain mapping is performed in N symbol durations, the same sequence is repeated N times in the time domain. Based on this fact, if some of N repeated signals are configured to be masked out in the case of the partial transmission during the symbol duration, correlation may be achieved between sequences. However, the number of SRS sequences that can be multiplexed in the frequency domain may be reduced due to the partial transmission.

Further, compared to the full transmission, a short length of sequence may be defined and used in the partial transmission by considering the correlation characteristics and the number of codes required for multiplexing.

3.4. BS (Cell) Selection (Handover) Based on Uplink-Based Measurement

In addition to TRP selection based on UL channel quality measurement using an SRS transmitted from a UE, a BS may perform BS selection (cell selection or cell handover).

Figure 15:
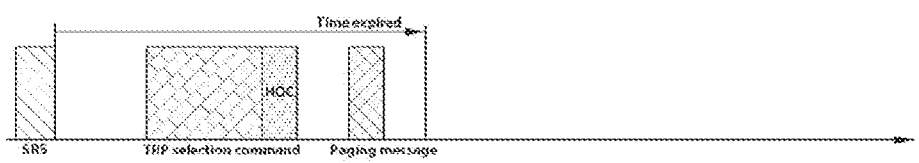
FIG. 15 is a diagram illustrating a TRP selection method and a BS (cell) selection method based on uplink channel quality measurement according to an embodiment of the present disclosure.
Figure 16:
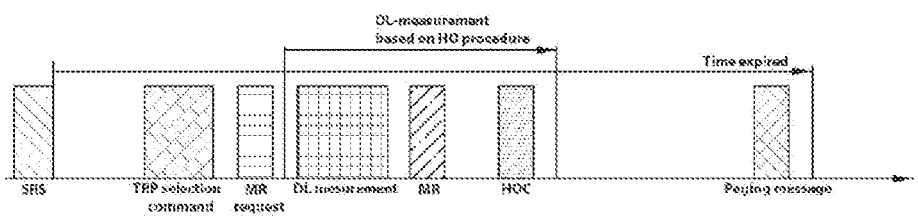
FIG. 16 is a diagram illustrating a TRP selection method and a BS (cell) selection method based on uplink channel quality measurement according to another embodiment of the present disclosure.

FIG. 15 illustrates an example of when a UE transmits an SRS and receives a paging message, a TRP selection command, and a BS selection command. The TRP selection process is described again briefly. First, a UE transmits an SRS according to a given configuration to perform TRP selection. Thereafter, all TRPs within a certain area (each TRP may belong to a different BS) may measure UL channel quality. A BS or a network entity receive UL CQI from each TRP. The BS or network entity selects a TRP capable of maintaining the best communication quality based on the received UL CQI.

A BS which the selected TRP belongs to may be different from the BS which the UE has communicated with. In this case, the BS may perform a process for allowing the UE to access another BS (to change a cell) (i.e., a BS selection or handover process). The BS selection may be performed even though the UE does not require second TRP information.

In the legacy LTE system, the handover has been defined to mean that a UE in the active state changes its BS, and the cell reselection has been defined to mean that a UE in the idle state is connected to another BS other than the currently connected BS. In the present disclosure, the handover or cell selection (or reselection) means that a UE is handed over from the currently connected BS to another BS regardless of the state of the UE, i.e., active, idle, or inactivate state.

Hereinafter, an example of the BS selection method will be described. First, based on the UL CQI, the BS or network entity checks a BS to which the TRP to be used in communicating with the UE belongs. When the BS to which the determined TRP belongs is different from the currently connected BS, the BS or network entity transmits a BS (cell) selection command or a handover command (HOC) to the UE.

In another example of the BS selection method, the BS or network entity receives the UL CQI in the same way as described above. When the BS or network entity determines based on the UL CQI that the BS change (handover) is high likely to occur, the BS or network entity transmits to the UE a measurement report (MR) request command for instructing the UE to measure DL channel quality during a predetermined time and send an MR including the measurement result. The MR request command may further include a command for instructing the UE not to enter the sleep mode while the UE is in the inactive state.

In this case, the BS may transmit information on additional measurement resources to be used by the UE in performing measurement for a neighboring BS in order to improve the accuracy of DL channel quality measurement. To efficiently use its resources, the BS may not transmit the information on the additional measurement resources at other times but transmit the information during the time indicated by the MR request command.

Upon receiving the MR request command, the UE performs the DL channel quality measurement for the serving BS and neighboring BSs. The BS determines whether the handover is required based on the MR received from the UE. When it is determined that the handover is required, the BS may transmit a command for instructing the UE to perform the handover (the BS selection command or HOC). If the UE does not receive the BS selection command or HOC from the BS after performing the DL channel quality measurement during the time indicated by the MR request command and reporting the measurement result, the UE may enter the sleep mode. Alternatively, when the BS determines that no handover is required, the BS may allow the UE to enter the sleep mode by directly informing the UE that no handover is required.

A signal for DL channel quality measurement may be defined for each BS to support UE mobility. The signal defined for each BS to support the UE mobility may correspond to a cell-specific reference signal (CRS) in the LTE system and a signal in a synchronization block or a mobility reference signal (MRS) defined for mobility measurement in the NR system. Further, the signal defined for each BS to support the UE mobility may be an RS for measuring DL channel quality during the time indicated by the MR request command

3.5. BS (Cell) Selection (Handover) Based on Downlink-Based Measurement

A BS or a network entity may transmit the configuration for SRS transmission to a UE to support UE mobility through UL channel quality measurement, and at the same time, further inform the UE of the configuration for supporting the UE mobility based on DL channel quality measurement (DL-based measurement) as in the legacy LTE system.

Figure 17:
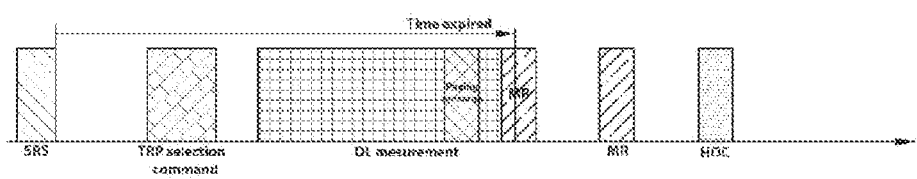
FIG. 17 is a diagram illustrating a TRP selection method and a BS (cell) selection method based on uplink channel quality measurement according to a further embodiment of the present disclosure.

FIG. 17 illustrates BS selection when a UE is configured to periodically measure DL channel quality.

Even when a UE fails to receive a TRP selection command or a BS selection command after transmitting an SRS, the UE may perform DL channel quality measurement according to a previously received DL channel quality measurement configuration.

The BS may instruct the UE to perform the DL channel quality measurement periodically and transmit relevant information to the UE. However, to efficiently manage the DL channel quality measurement together with UL channel quality measurement (UL-based measurement), the BS may instruct the UE to perform the DL channel quality measurement for a neighboring BS only when the UL channel quality of a serving BS satisfies a predetermined condition.

The UE performs the DL channel quality measurement. If the measurement result satisfies an MR transmission condition, the UE receives allocation of UL resources for transmitting an MR from the BS and then transmit the MR on the allocated resources. The BS performs BS selection based on the MR received from the UE. As described above, the BS may allocate a UE-dedicate channel for MR transmission to the UE, and the UE may transmit the MR over the channel. If there is no allocated channel, the UE may transmit the MR over a random access channel (RACH) according to the configuration thereof.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, a rule may be defined such that information on whether the proposed methods are applied (or information on rules related to the proposed methods) should be transmitted from a BS to a UE through a predefined signal (e.g., a physical layer signal, a higher layer signal, etc.).

4. Device Configuration

Figure 18:
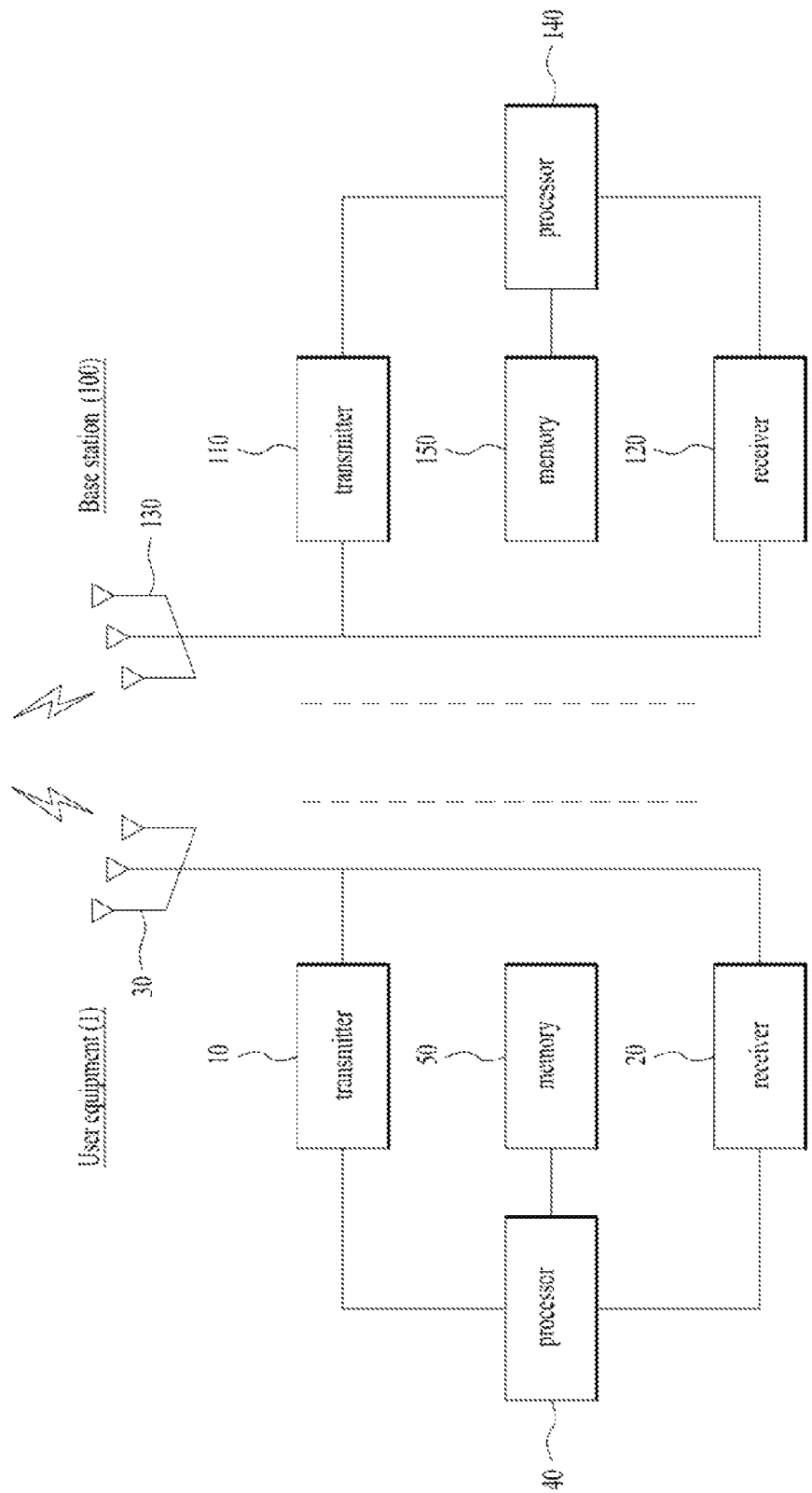
FIG. 18 is a diagram illustrating the configurations of a UE and a BS for implementing the proposed embodiments.

FIG. 18 is a diagram illustrating the configurations of a UE and a BS for implementing the proposed embodiments. The UE and the BS illustrated in FIG. 18 are implemented to perform the embodiments of the above-described method of transmitting a UL signal between a UE and a BS.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the BS 100 performs signal transmission and reception through the processor 140 using a plurality of distributed antennas. Specifically, the BS may control the plurality of distributed antennas to perform UL channel quality measurement using an SRS received from the UE. Then, the BS may receive UL CQI from the plurality of distributed antennas and then select a distributed antenna to communicate with the UE based on the received UL CQI. Thereafter, the BS may transmit information on the selected distributed antenna to the UE through at least one of the plurality of distributed antennas.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting and receiving a signal to and from a user equipment (UE) by a base station (BS) including a plurality of transmission and reception points (TRPs) in a wireless communication system, the method comprising:
   transmitting, to the UE, resource allocation information on an uplink signal for uplink channel quality measurement;
   receiving the uplink signal from the UE through each of the plurality of TRPs;
   measuring uplink channel quality for each of the TRPs using the received uplink signal;
   selecting a TRP to be used in transmitting and receiving the signal to and from the UE from among the plurality of TRPs based on the measured uplink channel quality; and
   transmitting, to the UE in a radio resource control (RRC) Inactive state, a TRP selection command including information on the selected TRP.

2. The method of claim 1, wherein the uplink signal for the uplink channel quality measurement corresponds to a sounding reference signal (SRS).

3. The method of claim 1, further comprising:
   periodically transmitting a paging message to the UE in the RRC Inactive state.

4. The method of claim 3, further comprising:
   configuring a time offset such that a reception period of the uplink signal is earlier by a predetermined time than a transmission period of the paging message and transmitting the time offset to the UE.

5. The method of claim 4, further comprising:
   configuring a different time offset for each of a plurality of UEs, including the UE, and transmitting the different time offset to each of the plurality of UEs.

6. The method of claim 1, further comprising:
   based on the selected TRP belonging to a neighboring BS, transmitting, to the UE, a BS selection command or cell selection command indicating handover to the neighboring BS.

7. The method of claim 1, further comprising:
   receiving, from the UE, downlink channel quality information (CQI) on the BS and a neighboring BS; and
   determining whether to hand over the UE based on the downlink CQI.

8. The method of claim 7,
   wherein the downlink CQI is received according to a downlink channel quality measurement report (MR) request transmitted by the BS, and
   wherein the downlink channel quality MR request is transmitted based on the selected TRP belonging to the neighboring BS.

9. The method of claim 8, wherein based on the UE being configured not to perform downlink channel quality measurement periodically, the downlink channel quality MR request includes resource allocation information for the downlink channel quality measurement.

10. The method of claim 7, wherein based on the UE being configured to perform downlink channel quality measurement periodically and a downlink channel quality measurement result of the UE satisfies a predetermined criterion, the downlink CQI is received.

11. The method of claim 10, wherein a downlink channel quality measurement period is equal to a transmission period of a paging message transmitted to the UE when the UE is in in the RRC Inactive sate.

12. The method of claim 1, further comprising transmitting, to the UE, a timing advance command for synchronizing reception times of the uplink signal.

13. The method of claim 12, wherein the uplink signal is allocated over N orthogonal frequency division multiplexing (OFDM) symbol durations on uplink resources, and wherein the uplink signal is fully transmitted by the UE during the N OFDM symbol durations and received by the plurality of TRPs, and wherein N is a positive real number.

14. The method of claim 12, wherein the timing advance command includes acknowledgement (ACK) information for the uplink signal.

15. The method of claim 1,
   wherein based on the BS transmitting no timing advance command to the UE and the BS allocating a sounding reference signal (SRS) over N orthogonal frequency division multiplexing (OFDM) symbol durations on uplink resources, the uplink signal is partially transmitted by the UE during L OFDM symbol durations and received by the plurality of TRPs, and
   wherein N is a positive real number and L is a positive real number smaller than N.

16. The method of claim 1,
   wherein uplink signals for the uplink channel quality measurement at a plurality of UEs, including the UE, are multiplexed and allocated over N orthogonal frequency division multiplexing (OFDM) symbol durations on uplink resources in a comb-type manner, and wherein N is a positive integer.

17. A method of transmitting and receiving a signal to and from a base station (BS) including a plurality of transmission and reception points (TRPs) by a user equipment (UE) in a wireless communication system, the method comprising:
   receiving, from the BS, resource allocation information on an uplink signal for uplink channel quality measurement;
   transmitting the uplink signal to the BS based on the resource allocation information; and
   attempting to receive, in a radio resource control (RRC) Inactive state, a TRP selection command including information on a TRP to be used in transmitting and receiving the signal to and from the BS.

18. The method of claim 17, further comprising:
   periodically receiving a paging message from the BS while in the RRC Inactive state,
   wherein the UE switches to the sleep mode based on:
   the UE successfully receiving the TRP selection command, the UE failing to receive the TRP selection command and a reception period of the paging message being elapsed, or the UE receiving, from the BS, a command for switching to a sleep mode.

19. A base station (BS) for transmitting and receiving a signal to and from a user equipment (UE) in a wireless communication system, wherein the BS includes a plurality of transmission and reception points (TRPs), the BS comprising:

a transmitter configured to communicate with the UE through the plurality of TRPs;

a receiver configured to communicate with the UE through the plurality of TRPs; and a processor, wherein the processor is configured to:

control the transmitter to transmit, to the UE, resource allocation information on an uplink signal for uplink channel quality measurement;

control the receiver to receive the uplink signal from the UE through each of the plurality of TRPs;

measure uplink channel quality for each of the TRPs using the received uplink signal;

select a TRP to be used in transmitting and receiving the signal to and from the UE from among the plurality of TRPs based on the measured uplink channel quality; and control the transmitter to transmit, to the UE in a radio resource control (RRC) Inactive state, a TRP selection command including information on the selected TRP.

* * * * *